March 27, 1962     H. GENT     3,027,557
LINEAR ARRAY WITH MODE CONVERSION
Filed May 9, 1955
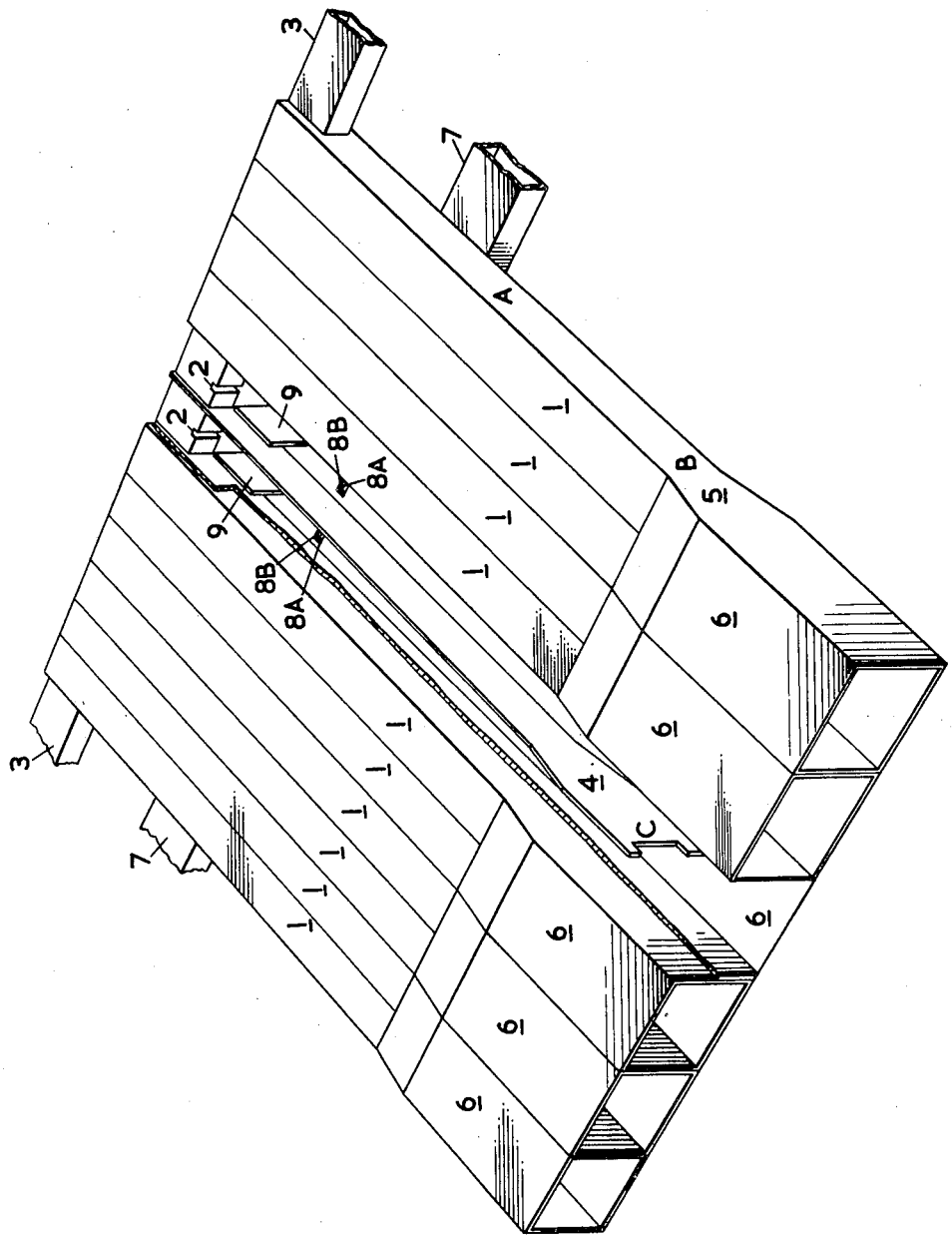
Inventor
By W.R. Maltby
Attorney

United States Patent Office 3,027,557
Patented Mar. 27, 1962

3,027,557
LINEAR ARRAY WITH MODE CONVERSION
Hubert Gent, West Malvern, England, assignor to the Minister of Supply in Her Majesty's Government of the United Kingdom of Great Britain and Northern Ireland, London, England
Filed May 9, 1955, Ser. No. 506,834
Claims priority, application Great Britain May 19, 1954
11 Claims. (Cl. 343—756)

This invention relates to waveguide devices and has reference to such devices in which a series of rectangular waveguide sections are placed side-by-side in line to form a so-called linear or in-line array; end apertures of the waveguides then form linear or in-line inputs or outputs according to the direction of transmission in the waveguides.

Often in such a linear array it is required to enlarge the transverse dimension of the constituent waveguides, i.e. the waveguide dimension transverse to the line of the array, to provide a suitable feed for a given mirror for example. This enlargement alters the overall polarisation-characteristic between the input and output of the waveguides and may have serious consequences in an array required to handle circularly polarised waves.

For instance, a linear array composed of square waveguides can transmit circularly polarised waves without serious decircularisation but where, for the purpose of feeding into a cylindrical mirror, it is necessary to provide an enlargement of the transverse waveguide dimension to give a greater transverse dimension of the apertures opposite the mirror, say by introducing an appropriate tapering of the waveguides, serious decircularisation of the output wave can occur. It is difficult to correct for such decircularisation without increasing the linear dimension of the array and that is generally undesirable.

It is an object of the invention therefore to provide a linear waveguide array in which polarisation adjustment or correction can be obtained.

Accordingly the invention provides a linear array of at least one group of side-by-side rectangular waveguides extending between input and output apertures, an input section of each waveguide extending from the input aperture being of symmetrical cross-section about transverse and inline axes, an output section of each waveguide extending to the output having a larger transverse dimension than the symmetrical section, and a taper section of each waveguide tapering in the transverse dimension and connecting the symmetrical section to the output section, adjacent walls of the waveguides of a group being foreshortened from the output aperture so that a part of the output section has an enlarged dimension in the line of the array determined by the overall in-line dimension of the group.

It is to be understood that such a waveguide device will in general be a reciprocal device in that an output aperture for one direction of propagation could become an input aperture if the direction of propagation were changed; the terms output and input are thus only relative terms so used for convenience of definition.

In order to make the invention clearer an embodiment will now be described reference being made to the accompanying drawings in which is shown a linear waveguide array for feeding a cylindrical mirror having a cosecant secondary polar diagram.

A linear array of side-by-side square waveguides 1 is fed by an array of slots 2 in the narrow face of a feed waveguide 3. The centre of cross-section of each waveguide 1 is aligned with the centre of a slot 2.

A dielectric quarter-wavelength slab (not shown) is inserted in each waveguide 1 across a diagonal and extends from A to B along each waveguide 1. At B the transverse dimension of each waveguide 1 is enlarged by introducing a section 5 having a transverse taper.

At a point C on every other pair of adjacent walls 4 of the waveguides 1 the walls 4 are themselves discontinued to provide a larger cross-section of waveguide 6; a pair of the waveguides 1 feeds into each waveguide 6. The waveguides 6 themselves provide output apertures which are suitable for feeding into a cylindrical mirror (not shown).

Operation as a transmitting array is as follows: The waveguide 3 by means of its slots 2 feeds longitudinally (i.e. in the line of the array) polarised waves into the square waveguides 1. The waveguides 1 by virtue of their square symmetry transmit these waves without changing their polarisation characteristics until the point A is reached.

The waves then passalong the portions AB of the waveguides 1 containing diagonal dielectric slabs and the waves become circularly polarised. The initial longitudinal polarisation consists of two equal plane polarised components parallel and perpendicular to the slab; the slab thus advances the phase of the parallel component by $\pi/2$ with respect to the phase of the perpendicular component thus producing a circularly polarised $H_{01}$ mode in the square waveguides 1 beyond B. The slabs are produced by casting in a suitable resin and for matching purposes 25° fishtail tapers are formed at each end.

The transverse taper section 5 in the present embodiment enlarges the transverse dimension of the waveguide into a suitable dimension for feeding a cylindrical mirror (not shown).

Such transverse tapering of the square waveguides 1 adversely affects the circularity of polarisation of the waves at the point B; these waves are accordingly decirculised in their passage beyond that point. The shortening of the alternate pairs of adjacent walls 4 forms enlarged waveguides 6 whose transverse dimension is less than their dimension along the line of the waveguide array. In the waveguide 6 therefore the decircularisation process is reversed, the reverse decircularisation due to the length of the section formed by these waveguides 6 being arranged to balance the decircularisation originally caused by the increase of the waveguide transverse dimension. The polarisation of the waves at the outut apertures of the waveguide 6 is thus circular.

At the point C where the enlargement of waveguide section in the line of the array takes place the end of each pair of foreshortened waveguide walls is cut away to provide a match for feeding from each pair of waveguides 1 to the enlarged waveguide 6.

For the purposes of reception circularly polarised waves of one hand are received at the output apertures of the waveguides 6 and propagated into the waveguides 1 finally reaching the array of slots 2 in the waveguide 3 as waves polarised in the longitudinal plane of the array.

In order to receive also circularly polarised waves of the opposite hand a feed waveguide 7 having an array of broad-face slots 8A is mounted under the waveguides 1 and feeds into these waveguides 1 by means of corresponding slots 8B therein.

Such circularly polarised waves when received at the output apertures of the waveguides 6 are propagated into the waveguides 1 as waves polarised in a plane transverse to the array. They then pass through the broad-face slots 8A, B into the waveguide 7.

Transverse plates 9 are provided at a distance a half-wavelength behind the broad face slots 8A, B to short-circuit transversely polarised waves travelling, in the waveguides 1, beyond the broad-face slots 8A, B. These plates 9, of course, have no effect on any waves in the waveguides 1 which are polarised in the plane of the array.

It should be noted that the waveguide 7 absorbs cross-polarised reflections, such as those from the circularising slabs, which occur during transmission from the waveguide 3 to the output apertures of the waveguides 6. Should therefore the waveguide 7 with the broad-face slots 8A, B not be provided, then transverse attenuators must be provided to absorb such reflections; in their absence some impairment of the circularisation of the radiated waves is inevitable.

In an alternative arrangement the polarising slabs may be omitted so that the array then functions to receive orthogonally plane polarised waves at the slot arrays of the waveguides 7 and 3.

This arrangement and that already described find application in radar systems making use of the properties of differently polarised waves.

The actual dimensions of the array depend, of course, on the wavelength it is desired to use. For an array for use with 10 cm. waves typical dimensions were as follows:

| | |
|---|---|
| Waveguide 3, external | $3'' \times 1\frac{1}{2}''$ |
| Spacing of the slots 2 in the waveguide 3 | $2.56''$ |
| Waveguides 1: | |
| Internal | $2.48'' \times 2.48''$ |
| Wall thickness | $0.08''$ |
| Enlarged waveguide 6, internal | $5.02'' \times 3.50''$ |
| Length of the taper section 5 | $2.62''$ |
| Length of the section 6 | $8.46''$ |

The transverse polar diagrams at the output apertures of the waveguides 6 were closely similar for polarisations transverse to and in the plane of the array and so were suitable for feeding a cylindrical cosecant mirror.

The degree of circularity obtained depends to some extent on the permissible tolerances in the waveguide dimensions but a practical figure of circularity is 0.90 (voltage ratio) over a band of ±3%.

I claim:

1. A waveguide device comprising a linear array of at least one group of side-by-side rectangular waveguides extending between input and output apertures, an input section of each waveguide extending from the input aperture being of symmetrical cross-section about transverse and in-line axes and having means located therein for changing the polarisation of waves in the section, an output section of each waveguide extending to the output aperture having a larger transverse dimension than the symmetrical section, and a taper section of each waveguide tapering in the transverse dimension and connecting the symmetrical section to the output section, adjacent walls of the waveguides of a group being foreshortened from the output aperture so that a part of the output section has an enlarged dimension in the line of the array determined by the overall in-line dimension of the group.

2. A waveguide device as claimed in claim 1, comprising a feed means for feeding waves polarised in the plane of the array at the input apertures of the waveguides, and means for circularly polarising plane polarised waves located in each symmetrical waveguide section.

3. A waveguide device as claimed in claim 2, wherein the symmetrical waveguide section is of square cross-section and the means for circularly polarising plane polarised waves comprises a plate of dielectric material diagonally disposed along a length of the square waveguide section.

4. A waveguide device as claimed in claim 3, wherein the feed means comprises a rectangular waveguide having transverse slots across its narrow face each slot feeding centrally into the input aperture of the square waveguide section.

5. A waveguide device as claimed in claim 4, wherein a conductive sheet is located along a length of each waveguide in a plane transversely of the array between the input apertures and the circularly polarising means whereby reflections from the polarising means of waves polarised transversely to the plane of the array are attenuated.

6. A waveguide device as claimed in claim 2, wherein a second feed means comprises means for feeding a wave polarised in the plane of the array to each input section.

7. A waveguide device as claimed in claim 6, wherein the linear array comprises a plurality of groups of waveguides, each group comprising two waveguides.

8. A waveguide device as claimed in claim 4, wherein a second feed means comprises a rectangular waveguide having longitudinal slots in its broad face and disposed across the input sections of the array in the in-line direction, and a feed path into each input section is provided for each longitudinal slot through a corresponding slot in each square waveguide section.

9. A waveguide device as claimed in claim 8, wherein the linear array comprises a plurality of groups of waveguides, each group comprising two waveguides.

10. A waveguide device as claimed in claim 9, wherein a conductive sheet is located along a length of each waveguide in a plane transversely of the array between the input aperture and the circularly polarising means and at a distance of one half wavelength from the second feed means, whereby reflections from the polarising means of waves polarised in a plane transverse to the array are attenuated.

11. A waveguide device comprising a linear array of at least one group of side-by-side rectangular waveguides extending between input and output apertures, an input section of each waveguide extending from the input aperture being of square cross-section, an output section of each waveguide extending to the output aperture having a larger transverse dimension than the square section, and a taper section of each waveguide tapering in the transverse dimension and connecting the square section to the output section, adjacent walls of the waveguides of a group being foreshortened from the output aperture so that a part of the output section has an enlarged dimension in the line of the array determined by the overall in-line dimension of the group, a first feed means comprising a rectangular waveguide having transverse slots across its narrow face for feeding waves polarised in the plane of the array centrally into the input aperture of the square waveguide section, and a second feed means comprising a rectangular waveguide disposed in the in-line direction across the input sections of the array and having longitudinal slots in its broad face providing a feed path into each square waveguide input section, whereby two orthogonally polarised waves, one in the plane of the array, received at the output apertures are separated into each feed means according to their polarisation.

References Cited in the file of this patent
UNITED STATES PATENTS
2,438,735    Alexanderson _____ Mar. 30, 1948